(12) United States Patent
Al-Shafei et al.

(10) Patent No.: US 11,261,098 B2
(45) Date of Patent: Mar. 1, 2022

(54) SYSTEMS AND METHODS FOR PREPARING NANO-SIZED CRYSTALS OF BEA ZEOLITE WITH METAL OXIDE FOR HYDROCARBON CONVERSIONS

(71) Applicants: Saudi Arabian Oil Company, Dhahran (SA); King Fahd University of Petroleum and Minerals, Dhahran (SA)

(72) Inventors: Emad Naji Al-Shafei, Dhahran (SA); Oki Muraza, Dhahran (SA); Mohamed Ahmed, Dhahran (SA); Ki-Hyouk Choi, Dhahran (SA); Ali Al-Nasir, Dhahran (SA); Zain Hassan Yamani, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 194 days.

(21) Appl. No.: 16/675,724

(22) Filed: Nov. 6, 2019

(65) Prior Publication Data
US 2021/0130178 A1    May 6, 2021

(51) Int. Cl.
*C01B 39/48*    (2006.01)
*B01J 29/70*    (2006.01)
(Continued)

(52) U.S. Cl.
CPC ......... *C01B 39/026* (2013.01); *B01J 29/7007* (2013.01); *B01J 29/7057* (2013.01);
(Continued)

(58) Field of Classification Search
CPC . C01B 39/026; B01J 29/7007; B01J 29/7057; B01J 29/7215; B01J 29/7415;
(Continued)

(56) References Cited

U.S. PATENT DOCUMENTS 4,336,234 A    6/1982    Leutner et al.
5,061,466 A    10/1991   Chang et al.
(Continued)

FOREIGN PATENT DOCUMENTS

CA    2670616 A1    10/2009
CN    1488722 A     4/2004
(Continued)

OTHER PUBLICATIONS

Ahmed etal, "Steam Catalytic Cracking of n-Dodecane over Ni and Ni/Co Bimetallic Catalyst Supported on Hierarchical BEA Zeolite", Energy Fuels (2017), 31,5482-5490 (Year: 2017).*
(Continued)

*Primary Examiner* — David M Brunsman
(74) *Attorney, Agent, or Firm* — Bracewell LLP; Constance G. Rhebergen; Kevin R. Tamm

(57) ABSTRACT

Methods and systems for production of consistently-sized BEA zeolite nano-crystals incorporating at least one metal oxide, the method including removing an organic template from a BEA zeolite comprising an organic template via calcination; desilicating the BEA zeolite following the step of removing the organic template; incorporating at least one metal oxide into the structure of the BEA zeolite after the step of desilicating; protonating the BEA zeolite after the step of incorporating the at least one metal oxide; and calcining the BEA zeolite after the step of protonating to form a modified BEA zeolite product.

18 Claims, 6 Drawing Sheets

(51) Int. Cl.

| | |
|---|---|
| *C10G 11/05* | (2006.01) |
| *C01B 39/02* | (2006.01) |
| *B01J 29/76* | (2006.01) |
| *B01J 29/74* | (2006.01) |
| *B01J 29/78* | (2006.01) |
| *B01J 29/72* | (2006.01) |
| *B82Y 40/00* | (2011.01) |

(52) U.S. Cl.
CPC ....... *B01J 29/7215* (2013.01); *B01J 29/7415* (2013.01); *B01J 29/7615* (2013.01); *B01J 29/7815* (2013.01); *C01B 39/48* (2013.01); *C10G 11/05* (2013.01); *B01J 2229/36* (2013.01); *B82Y 40/00* (2013.01); *C01P 2002/72* (2013.01); *C01P 2004/03* (2013.01); *C01P 2004/64* (2013.01); *C01P 2006/12* (2013.01); *C01P 2006/14* (2013.01)

(58) Field of Classification Search
CPC ................ B01J 29/7615; B01J 29/7815; B01J 2229/30; B01J 2229/36; B01J 2229/40; B01J 2229/186; C10G 11/05; C01P 2004/03; C01P 2004/62; C01P 2006/12; C01P 2006/14
See application file for complete search history.

(56) References Cited

U.S. PATENT DOCUMENTS

| | | | |
|---|---|---|---|
| 9,242,234 | B2 | 1/2016 | Van Donk et al. |
| 9,616,416 | B2 | 4/2017 | Van Donk et al. |
| 2009/0272674 | A1 | 11/2009 | Zheng et al. |
| 2014/0357909 | A1 | 12/2014 | Minoux et al. |
| 2018/0022611 | A1 | 1/2018 | Feyen et al. |
| 2018/0361365 | A1 | 12/2018 | Jermy et al. |

FOREIGN PATENT DOCUMENTS

| | | |
|---|---|---|
| CN | 1255513 C | 5/2006 |
| CN | 101811063 A | 8/2010 |
| CN | 102180479 A | 9/2011 |
| EP | 0863109 A1 | 9/1998 |
| EP | 3409358 A1 | 12/2018 |
| KR | 20060074102 A | 7/2006 |

OTHER PUBLICATIONS

Menad et al., "Synthesis and Study of Calcination Temperature Influence on the Change of Structural Properties of the LTA Zeolite ", Rasayan J. Chern., vol. 9 | No. 4 |788-797 | Oct.-Dec. 2016 (Year: 2016).*

Theng et al., "Ion Exchange in Synthetic Zeolites Part 1.—Ammonium and some of its Alkyl Derivatives in Linde Sieves X and Y", Ion Exchange in Synthetic Zeolites (1968) pp. 3370-3382 (Year: 1968).*

Ahmed et al., "Hydrothermal Stabilization of Rich Al-BEA Zeolite by Post-Synthesis Addition of Zr for Steam Catalytic Cracking of n-Dodecane," American Chemical Society, Energy Fuels, vol. 32(4), Feb. 19, 2018: pp. 5501-5508.

Ahmed et al., "Steam Catalytic Cracking of n-Dodecane over Ni and Ni/Co Bimetallic Catalyst Supported on Hierarchical BEA Zeolite," American Chemical Society, Energy Fuels, vol. 31 (5), Apr. 20, 2017: pp. 5482-5490.

International Search Report and Written Opinion of PCT Application No. PCT/US2020/058449 dated Feb. 5, 2021: pp. 1-14.

Blay, V., et al., 'Engineering Zeolites for Catalytic Cracking to Light Olefins', ACS Catalysis, 7, 2017, pp. 3542-6566.

* cited by examiner

SYSTEMS AND METHODS FOR PREPARING NANO-SIZED CRYSTALS OF BEA ZEOLITE WITH METAL OXIDE FOR HYDROCARBON CONVERSIONS

BACKGROUND

Field

The present disclosure relates to systems and methods for production of Beta structured (BEA) zeolites containing a metal oxide. Specifically, the disclosure presents systems and methods to incorporate one or more metal oxide into nano-sized BEA zeolites, starting in an organic template form, for use as catalysts in hydrocarbon cracking and related hydrocarbon conversion processes.

Description of the Related Art

Beta structured (BEA) zeolites are used in automotive emissions control, industrial off-gas purification, volatile organic carbon (VOC) reduction, and nitrogen oxides (NOx) reduction technologies. As process catalysts, they are used for fuel upgrading, production of petrochemical intermediates, and processing chemicals. BEA zeolites are also useful for adsorption purposes, such as odor removal and active carbon replacement.

Growing demand for new catalytic chemical processing has led to a rise in the need for more reactive and selective catalysts. Nanotechnology for the production of catalytic material is essential to overcoming catalytic reaction limitations by allowing for greater dispersion of reactive catalysts, which leads to greater turnover of hydrocarbon conversion. BEA zeolite exhibits 3-D pore channels and is therefore useful to exploit shape selectivity in reactions.

BEA zeolite is used, for example, as catalyst for dewaxing and other hydrocarbon reactions such as aromatic alkylation. BEA zeolite is also used as an additive for fluid catalytic cracking (FCC) catalysts to increase olefin yield.

BEA zeolite imposes diffusion limitations for large molecules that can be reactants as well as products. In particular, cracking reactions over acidic sites on BEA zeolite accompany coke formation and deposition, which arise from "over-staying" of fragmented hydrocarbons in zeolite pore structures at elevated temperatures. Thus, the presence of controlled diffusion paths are important while maintaining surface activity. One method to control diffusion paths is to synthesize BEA zeolite nano-sized crystals.

There are several methods to make nano-sized zeolites, for example by increasing temperature during crystal formation, controlling stirring speed, selecting appropriate template types, applying gel aging, and applying supercritical fluids. However, known systems and methods are insufficient for continuously and consistently producing characterizable nano-sized BEA zeolite crystals at desired size ranges including a metal oxide.

Another present issue is that in the presence of steam, zeolite catalysts can deactivate, and reactivity for hydrocarbon conversion is reduced. When used with steam, for non-modified zeolites, alumina is usually leached out from the framework of zeolites, and then the zeolite experiences loss in acidity, texture properties, reactivity, and in the shape selectivity reactions via micropores of the zeolite.

BEA zeolite has been found to be an unstable catalytic material for certain hydrocarbon conversion processes due to the rate of coke formation. In addition, BEA zeolite shows low reactive catalysis in the presence of steam with poor hydrocarbon conversion.

Therefore, nano-sized BEA is not easily utilized for hydrocarbon conversion applications. The state of the art does not provide for stepwise manufacturing processes designed to produce hydrophobic-like nano BEA (beta) zeolite incorporating one or more selective and reactive metal oxide.

SUMMARY

Applicant has recognized a need for systems and methods to continuously and consistently produce characterizable nano-sized BEA zeolite crystals at desired size ranges including a metal oxide, for example a transition metal oxide. Prior art technical problems include producing consistently-sized nano-sized BEA zeolite crystals and continuously producing such BEA zeolite crystals to obtain, and characterize, them at a large industrial scale. There exists a need for framework structure improvements and re-stabilization of the zeolite via specific treatment and incorporation with selected metal oxides in order for BEA zeolite to be applied for hydrocarbon conversion reactions with or without steam cracking. The produced nano-sized BEA zeolite crystals with a metal oxide disclosed here are characterized and can be used in oil upgrading technologies and other petrochemical applications, for example as greatly dispersible catalysts.

Systems and processes disclosed and exemplified here show development of hydrophobic-like catalysts by incorporating at least one metal oxide, for example a transition metal oxide, into nano-sized BEA zeolite. The modified hydrophobic-like catalyst can be effectively used in steam catalytic cracking as a catalyst for paraffin cracking and related hydrocarbon conversions.

In some embodiments, five consecutive steps are applied for preparing modified hydrophobic-like, nano-sized BEA zeolite catalyst. The production process includes the conversion of microporous frameworks to higher mesoporous frameworks for the nano-sized BEA zeolite. In some embodiments, a pore volume ratio for mesoporosity to microporosity is increased by about 80%. In some embodiments, a surface area ratio for mesoporosity to microporosity ratio is increased by about 7%. In some embodiments, mesoporosity of the catalyst surface area is increased in the range of about 330%. In some embodiments, mesoporous pore volume is increased in the range of about 370% compared to non-modified nano-sized BEA zeolite not containing a metal oxide. The improvement of nano-sized BEA catalyst is important for it to be used in reactions requiring steam to assist in the cracking of hydrocarbons and other conversions.

Systems and methods can be applied to nano-sized crystals of BEA (beta) zeolite in a size range of about 100 nm to about 900 nm in order to convert the zeolite into hydrophobic-like zeolite catalysts through five treatment stages. The produced modified zeolite can then be effectively used for steam cracking for oil conversions, and for other petroleum refinery processing and petrochemical applications.

Embodiments here use nano-sized BEA zeolite in organic template form with tetraethylammonium hydroxide (TEAOH) after initial formation, and before any modifications. A desilication step increases pore volume and surface area of nano-sized BEA before loading a metal oxide catalyst. Desilication in some embodiments is carried out with use of a hydroxide, for example NaOH solution, and water washing to reach a pH level between about pH 7 and pH 8.5, before any loading of metal oxide catalyst to the nano zeolite. After desilication, catalytic nitration is applied to load a metal catalyst in a separate step.

In certain systems and processes, five consecutive compartments are applied to process nano-sized BEA zeolite material from an initial organic template of tetraethylammonium hydroxide to a modified metal-oxide-containing catalytic zeolite material. The systems and processes disclosed ultimately produce a hydrophobic-like, nano-sized BEA zeolite. Systems and processes treat nano-sized BEA zeolite in organic template form. Stepwise modification is carried out to develop nano-sized BEA zeolite to be used for steam cracking of hydrocarbons and other hydrocarbon conversion reactions.

The initial BEA zeolite for modification or treatment is a precursor material, or in other words a dried form of nano-sized BEA zeolite in an organic template phase. Produced, un-modified, organic template nano-sized BEA zeolite is desilicated first, followed by catalyzing the BEA zeolite with one or more metal oxides, followed by protonation that aims to increase catalyst reactivity. Pore volume ratio of mesoporosity to microporosity and surface area ratio of mesoporosity to microporosity can increase by more than 100%, and this is important for steam cracking of large hydrocarbon molecules. Feedstocks for treatment can include petroleum-based crude oil, refinery streams, streams from gas-to-liquids processes, biomass conversion process streams, and natural gas conversion process streams, for example.

Metal-oxide-modified nano-sized BEA zeolites disclosed here offer wide application for hydrocarbon conversions, both with and without steam, for example oil upgrading, refinery applications, and petrochemical applications. The modification of nano-sized BEA zeolite to a hydrophobic-like, metal-oxide-containing zeolite results in a catalyst stable for use with steam for hydrocarbon conversions. Consistently-sized nano-sized BEA zeolite crystals of the present disclosure, characterization of which is further discussed as follows, exhibit improved performance in hydrocarbon cracking and conversion processes.

Thus, disclosed here is a method for production of consistently-sized BEA zeolite nano-crystals incorporating at least one metal oxide, the method including removing an organic template from a BEA zeolite comprising an organic template via calcination; desilicating the BEA zeolite following the step of removing the organic template; incorporating at least one metal oxide into the structure of the BEA zeolite after the step of desilicating; protonating the BEA zeolite after the step of incorporating the at least one metal oxide; and calcining the BEA zeolite after the step of protonating to form a modified BEA zeolite product.

In some embodiments, the step of removing the organic template comprises heating the BEA zeolite with the organic template from an initial temperature range of about 15° C. to about 35° C. to reach a temperature range between about 520° C. to about 580° C., at a heating ramp rate of about 5° C./min, for isothermal heating lasting between about 9 hours and about 13 hours. In other embodiments, the organic template comprises tetraethylammonium hydroxide. Still in other embodiments, the step of desilicating the BEA zeolite includes the use of a hydroxide solution between about 0.05 M and about 0.2 M and where the hydroxide solution includes at least one of sodium hydroxide, beryllium hydroxide, calcium hydroxide, lithium hydroxide, strontium hydroxide, magnesium hydroxide, barium hydroxide, potassium hydroxide, cesium hydroxide, or mixtures thereof. In yet other embodiments, the step of desilicating includes mixing the BEA zeolite with the hydroxide solution for between about 10 minutes and about 20 minutes at a temperature of between about 55° C. and 75° C., then washing the BEA zeolite with distilled water to obtain a pH range between about pH 7 to about pH 8.5.

In certain other embodiments, the step of incorporating at least one metal oxide incorporates a metal oxide selected from the group consisting of: cobalt oxide, nickel oxide, vanadium oxide, zinc oxide, tungsten oxide, niobium oxide, gallium oxide, copper oxide, iron oxide, palladium oxide, platinum oxide, iridium oxide, ruthenium oxide, rhodium oxide, and combinations thereof. Still in other embodiments, the step of incorporating at least one metal oxide includes the use of a metal nitrate solution between about 0.4 M and about 1.2 M, and where the temperature during the step is between about 55° C. and about 75° C., and where the step proceeds for between about 60 min. and about 240 min. In certain embodiments, the step of protonating includes the use of an ammonium nitrate solution, and the ammonium nitrate solution is mixed with the BEA zeolite at a temperature between about 75° C. and about 95° C. for about 3 hours. Still in other embodiments, inline centrifugation is carried out following the steps of desilicating, incorporating at least one metal oxide, and protonating to separate out the BEA zeolite.

In certain embodiments of the method, the step of calcining includes a step of drying the BEA zeolite at temperature between about 90° C. and about 100° C. isothermally for an amount of time between about 18 hours and about 24 hours in order to dry the BEA zeolite and remove water. Still in other embodiments, after the step of drying, the BEA zeolite is heated to between about 520° C. and about 580° C. with temperature ramping at about 5° C./min, with an isothermal heating time of between about 9 and about 13 hours. In some embodiments, the modified BEA zeolite product exhibits characterizable crystals between about 100 nm and about 900 nm.

In still other embodiments, the modified BEA zeolite product exhibits characterizable crystals between about 300 nm and about 700 nm. In some embodiments, the modified BEA zeolite product exhibits catalytic surface acidity of about 1,200 µmol of $NH_3$/g. Still in other embodiments, the modified BEA zeolite product exhibits catalytic surface acidity of between about 500 µmol of $NH_3$/g to about 2000 µmol of $NH_3$/g. In yet other embodiments, the modified BEA zeolite product exhibits catalytic surface acidity of between about 700 µmol of $NH_3$/g to about 1500 µmol of $NH_3$/g. Still in other embodiments, the modified BEA zeolite product exhibits increased mesopore surface area and increased mesopore volume compared to the BEA zeolite comprising an organic template. In certain embodiments of the method, the modified BEA zeolite product exhibits a mesopore surface increase between about 50% to about 600% compared to the BEA zeolite.

In certain embodiments, the modified BEA zeolite product exhibits a mesopore volume increase between about 50% to about 600% compared to the BEA zeolite. Still other embodiments further include the step of using the modified BEA zeolite product as a catalyst in a hydrocarbon conversion reaction. In certain embodiments, the hydrocarbon conversion reaction includes steam cracking of paraffins to iso-paraffins, cycloparaffins, olefins, and aromatics. In certain embodiments, the hydrocarbon conversion reaction is carried out on a feedstock comprising at least 5 wt. % paraffins. Still other embodiments include the step of producing the BEA zeolite comprising an organic template from a solution comprising colloidal silica, tetraethylammonium hydroxide, and sodium aluminate.

Additionally disclosed here is a system for carrying out the various methods, the system including a first compartment operable to heat the BEA zeolite comprising the organic template for calcination; a second compartment, fluidly coupled to the first compartment, and operable to desilicate the BEA zeolite by applying heating and mixing to the BEA zeolite in solution; a third compartment, fluidly coupled to the second compartment, and operable to incorporate the at least one metal oxide into the structure of the BEA zeolite by applying heating and mixing to the BEA zeolite in solution; a fourth compartment, fluidly coupled to the third compartment, and operable to protonate the BEA zeolite by applying heating and mixing to the BEA zeolite in solution; and a fifth compartment, fluidly coupled to the fourth compartment, and operable to dry and calcine the BEA zeolite to obtain the modified BEA zeolite product.

In some embodiments, the system includes a first inline centrifuge between the second compartment and third compartment, a second inline centrifuge between the third compartment and fourth compartment, and a third inline centrifuge between the fourth compartment and fifth compartment, the inline centrifuges operable to separate the BEA zeolite from BEA zeolite solutions.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1A:
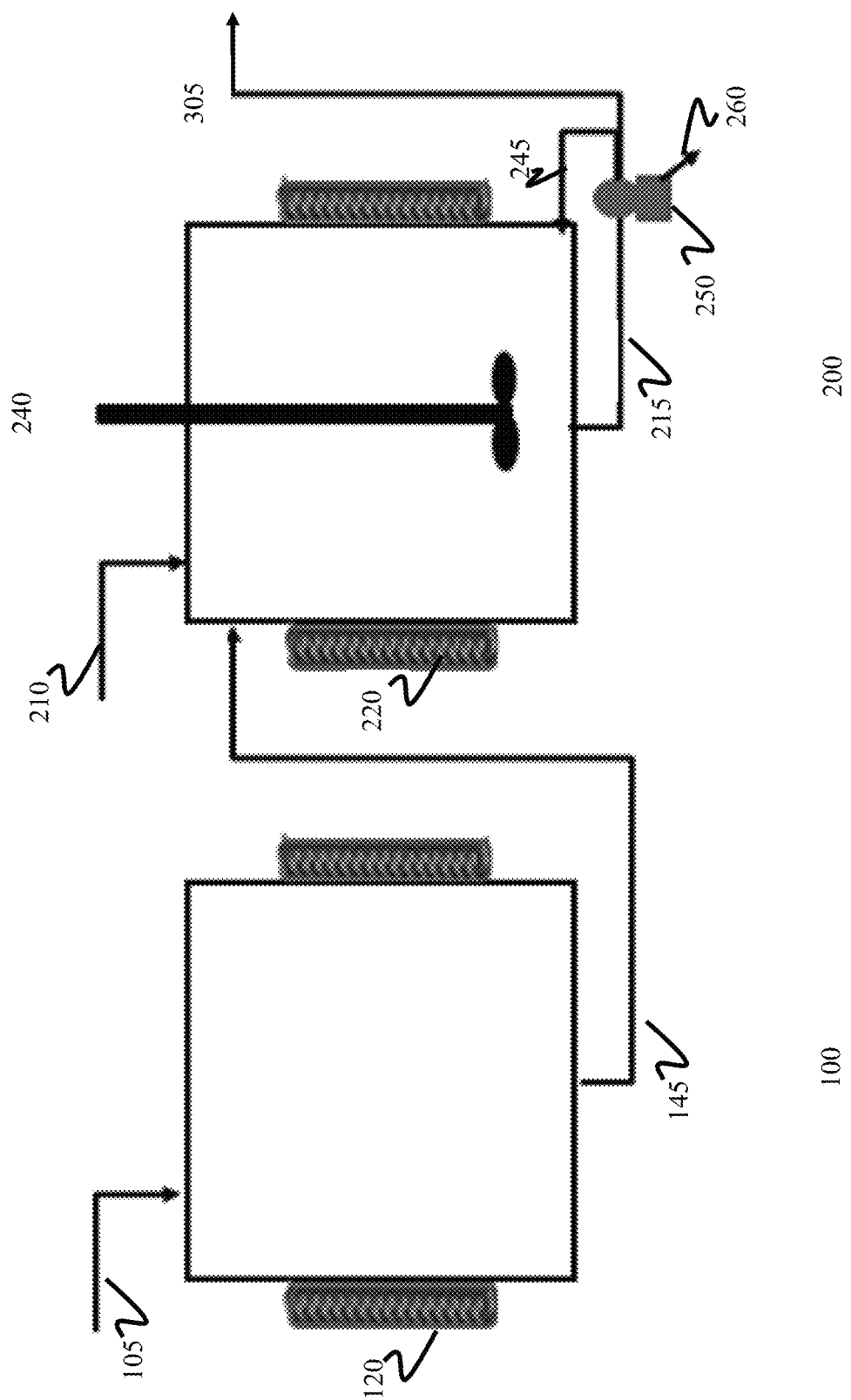
FIGS. 1A and 1B are schematic diagrams showing an example system and process for continuously producing consistently-sized and characterizable hydrophobic-like, nano-sized BEA zeolite crystals including a metal oxide.

So that the manner in which the features and advantages of the embodiments of systems and methods for continuously producing consistently-sized and characterizable nano-sized BEA zeolite crystals containing a metal oxide, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

In embodiments of the systems and processes disclosed here, a first step can include production of un-modified organic templated nano-sized BEA zeolite; however, in some embodiments the production of the initial zeolite is not included in the process.

Nano-sized BEA zeolite in organic template can be prepared as follows. In a 20 L autoclave vessel, 3 kg of distilled water and 3.48 kg of colloidal silica (40 wt. % $SiO_2$ in water) are mixed to make a silica solution. The silica solution is next stirred by a shearing device at a speed of between about 600 rpm and about 900 rpm for between about 15 min. to about 30 min. at about room temperature. Next, 3 kg of organic template tetraethylammonium hydroxide (TEAOH, 40 wt. % in $H_2O$) is added to the silica solution with a stirring speed of between about 600 rpm and about 900 rpm for between about 10 min. to about 30 min. at a temperature between about 18° C. and about 35° C. Afterward, 0.076 kg of a solution of sodium aluminate ($NaAlO_2$) is added in order to synthesize BEA zeolite at a silicon to aluminum molar ratio of 30. The stirring speed is set between about 600 rpm and about 900 rpm and is applied for about 1 hour at a temperature between about 18° C. and about 35° C. Other suitable methods can be used to produce the nano-sized BEA zeolite in organic template.

A suitable range for a silicon to aluminum molar ratio can be from about 10 to about 250, or from between about 15 to about 100. Suitable sources of silicon include, but are not limited to, any one of or any combination of sodium silicate, silicic acid, amorphous silica, fumed silica, and silica gel. Suitable sources of aluminum include, but are not limited to, any one of or any combination of aluminum sulfate octadecahydrate (formula: $Al_2(SO_4)_3 \cdot 18H_2O$), aluminum oxide ($Al_2O_3$), aluminum hydroxide ($Al(OH)_3$), and aluminum metal (Al). In certain embodiments, tetraethylammonium hydroxide (TEAOH) was used as a template for BEA zeolite. However, tetraethylammonium chloride (TEACl) and tetraethylammonium bromide (TEAB) are also suitable, or any combination of these or similar organic templates.

Next, after stirring is stopped, an oven is used to heat the zeolite solution from the temperature of between about 18° C. to about 35° C. up to between about 135° C. and about 155° C., preferably about 145° C., with temperature ramping of about 5° C./min. The zeolite solution is aged isothermally for between about 67 hours and 77 hours, preferably 72 hours, in order to form powder precipitate of nano-sized BEA zeolite in organic template. The powder of BEA zeolite is next washed by distilled water 2 to 3 times and filtered. The zeolite is dried at a temperature between about 75° C. and about 110° C. to remove water content from the material before sending the BEA zeolite to be modified by systems and processes disclosed here.

Figure 1B:
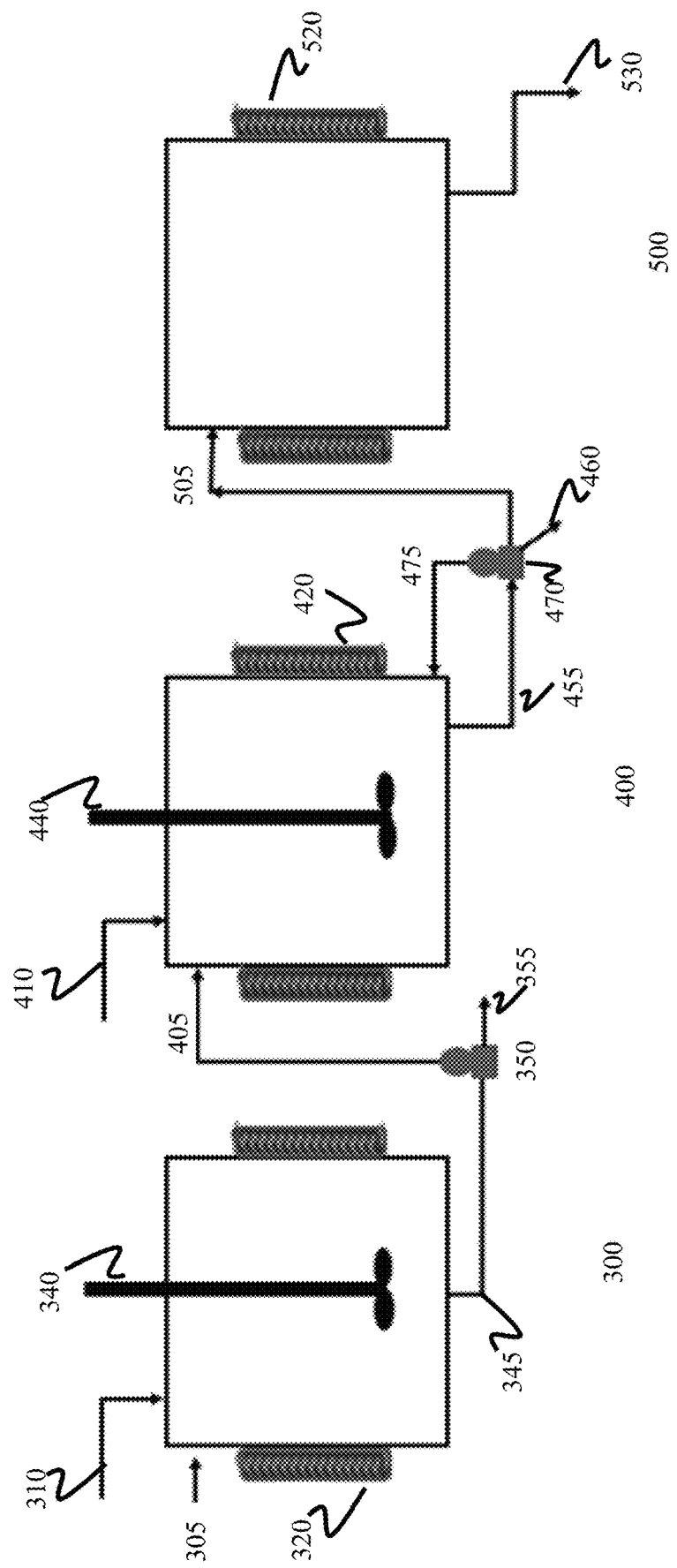

Now referring to FIGS. 1A and 1B along with examples, schematic diagrams are shown for an example system and process for continuously producing consistently-sized and characterizable hydrophobic-like, nano-sized BEA zeolite crystals including a metal oxide. Five main compartments carry out five steps: calcination in calcination unit 100; desilication in desilication unit 200; catalytic nitration in catalytic nitration unit 300; protonation in protonation unit 400; and calcination in calcination unit 500. FIG. 1B shows a continuation of the process from FIG. 1A. The process and system represented in FIGS. 1A and 1B can be run in a batch or continuous mode.

In calcination unit 100, dried powder of nano-sized BEA zeolite, optionally prepared by the method described previously, enters via line 105 and is heated for calcination at atmospheric pressure in static air in order to decompose and remove organic template tetraethylammonium hydroxide from the nano-sized BEA zeolite. Heating element 120 enables heating of calcination unit 100.

In some embodiments, the temperature of calcination unit 100 is increased from an initial temperature range of about 15° C. to about 35° C. to reach a temperature range between about 520° C. to about 580° C. for calcination, preferably about 550° C. for isothermal heating lasting between about 9 hours and about 13 hours, preferably about 11 hours. The heating ramp rate is about 5° C./min. Afterward, heating element 120 temperature is reduced and the temperature of calcination unit 100 is lowered to between about 15° C. and about 50° C. The calcined BEA zeolite is evacuated via line 145 for further treatment via desilication unit 200. Air can be applied via line 105 and/or vacuum applied via line 145 to evacuate power from calcination unit 100.

In desilication unit 200 the temperature is set to about 65° C. by adjusting heating element 220, and sodium hydroxide (NaOH) at a concentration in distilled water of 0.1 molar is introduced via line 210 to the calcined nano-sized BEA zeolite powder. Stirring is applied in desilication unit 200 via stir rod 240 at a speed of between about 400 rpm and about 500 rpm isothermally for between about 10 and about 20 minutes, preferably about 15 minutes. The mass ratio of NaOH solution to zeolite can be between about 5-30 to 1, or between about 10-20 to 1. Afterward, temperature of heating element 220 was reduced to allow the solution to cool to a temperature in the range of between about 15° C. to about 35° C.

The hydroxide solution is evacuated via line 215 to an inline centrifuge unit 250, which is operated at speed between about 2000 rpm and about 3000 rpm. A light phase of sodium hydroxide solution is removed via line 260. Any heavy phase and any zeolite powder is recycled via line 245 to desilication unit 200 for further water washing. Inline centrifuge 250 includes two outlets, where a first outlet is for light phase including water and sodium hydroxide (line 260). A second outlet (line 245) is for heavy phase (a slurry of particles suspended in water) to be returned back to desilication unit 200 to be washed by water again to remove any remaining sodium hydroxide from powder.

Distilled water washing of the BEA zeolite with stirring at between about 400 rpm and about 500 rpm via stir rod 240 is carried out for between about 2 min. and about 4 min., preferably about 3 min., and the mass ratio between about 10-30 water to 1 to zeolite was used, and optionally the mass ratio of water to zeolite for washing can be tween about 5-30 to 1 or between about 10-20 to 1 in order to remove any remaining sodium hydroxide from the zeolite material.

Next, stirring in desilication unit 200 via stir rod 240 is discontinued, and zeolite catalyst is sent for final water washing via inline centrifuge unit 250 operated at speed between about 2000 rpm and about 3000. A light phase of water is removed via line 260, and heavy phase and any powder are evacuated via line 305 to catalytic nitration unit 300 (FIG. 1B). The light phase of the wash water is tested for pH level, either automatically or by hand. When the water pH reading is in the range of about 7 to about 8.5, the zeolite is ready to be sent to catalytic nitration unit 300 via line 305. If the pH reading is in the range of about 12 to about 8.6, the zeolite powder and heavy phase must be returned back to desilication unit 200 for further water washing.

Catalytic nitration unit 300 is operated once it receives the nano-sized BEA zeolite from desilication unit 200 via line 305. Catalytic nitration unit 300 incorporates one or more metal oxide catalyst, for example a transition metal oxide catalyst, into calcined, desilicated nano-sized BEA zeolite. Optional and suitable metal oxides include cobalt oxide, nickel oxide, vanadium oxide, zinc oxide, tungsten oxide, niobium oxide, gallium oxide, copper oxide, iron oxide, palladium oxide, platinum oxide, iridium oxide, ruthenium oxide, rhodium oxide, and combinations of the same. Catalytic nitration unit 300 introduces a selected catalyst of metal oxide into the nano-sized BEA zeolite structure after desilication by dissolving metal nitrate in the precursor solution of zeolite.

For example, a solution of 0.6 molar single metal nitrate dissolved in distilled water can be introduced via line 310. In a case where two catalysts based on two different metal nitrates are to be introduced via line 310, the molarity of the solutions is selected and calculated before mixing, and is from about 0.1 molar to about 1.0 molar. A mass ratio of metal nitrate solution to nano-sized BEA zeolite powder can be about 5 to 1, and heating element 320 was applied to reach a temperature of about 65° C. For example, 1 kg of zeolite requires about 5 kg of metal nitrate solution at about 0.6 molar concentration. Stirring is applied for between about 120 min. to about 240 min. at a speed of between about 300 rpm and about 500 rpm via stir rod 340.

The catalytic-nitrate solution with BEA zeolite is next sent to inline centrifuge unit 350, which is operated at speed between about 2000 rpm and about 3000 rpm, and a light phase of non-dissolved nitrate solution is removed via line 355, and a heavy phase including any powder of nano-sized BEA zeolite incorporated with metal catalyst and nitrate is sent to protonation unit 400 via line 405 for further treatment.

Protonation unit 400 is operated at a temperature of about 85° C., utilizing heating element 420, in order to further treat the BEA zeolite. An ammonium nitrate solution of about 2 molar in distilled water is introduced via line 410, and the mass ratio of solution to zeolite is between about 10-20 to 1, or between about 5-30 to 1. Once solution temperature reaches about 85° C., stirring is applied via stir rod 440 for about 3 hours at a speed between about 400 rpm and about 500 rpm.

Afterward, stirring and heating were discontinued, and once the temperature of solution reaches between about 15° C. to about 35° C., the solution is evacuated via line 455 and sent to inline centrifuge unit 470, which is operated at a speed between about 2000 rpm and about 3000 rpm. A light phase of non-dissolved ammonium nitrate solution and any sodium nitrate from the protonation step is removed via line 460.

A heavy phase including any powder of protonated nano-sized BEA zeolite is recycled to protonation unit 400 via line 475 for further distilled water washing introduced via line 410. The water quantity introduced is about 10-30 times larger by mass than zeolite material for water washing and no heat is applied. Stirring from stir rod 440 is applied at between about 400 rpm and about 500 rpm for between about 2 min. and about 4 min., preferably about 3 min. Next, the solution and zeolite are sent to inline centrifuge 470, and the light phase of water is removed via line 460 and the heavy phase with the powder of protonated, metal-catalyzed nano-sized BEA zeolite is sent to calcination unit 500 via line 505 for further treatment.

In calcination unit 500, drying of the zeolite product is carried out by heating the powdery solid obtained from protonation unit 400 using heating element 520 at a temperature between about 90° C. and about 100° C., and isothermally drying for a time between about 18 hours and about 24 hours in order to dry the zeolite and remove water.

Next, calcination unit 500, with an atmosphere of static air, is set at temperature of between about 520° C. and about 580° C., preferably about 550° C., and temperature ramping is about 5° C./min, and isothermal heating is carried out for a time of between about 9 and about 13 hours, preferably about 11 hours. Afterward, heating element 520 is reduced in temperature, and when the temperature of calcination unit 500 reaches between about 15° C. and about 50° C., the metal-catalyzed nano-sized BEA zeolite has been protonated, desilicated, and incorporated or infused with one or more metal oxide catalyst. Then zeolite is evacuated via line 530 in order to be stored and saved away from moisture.

Figure 2:
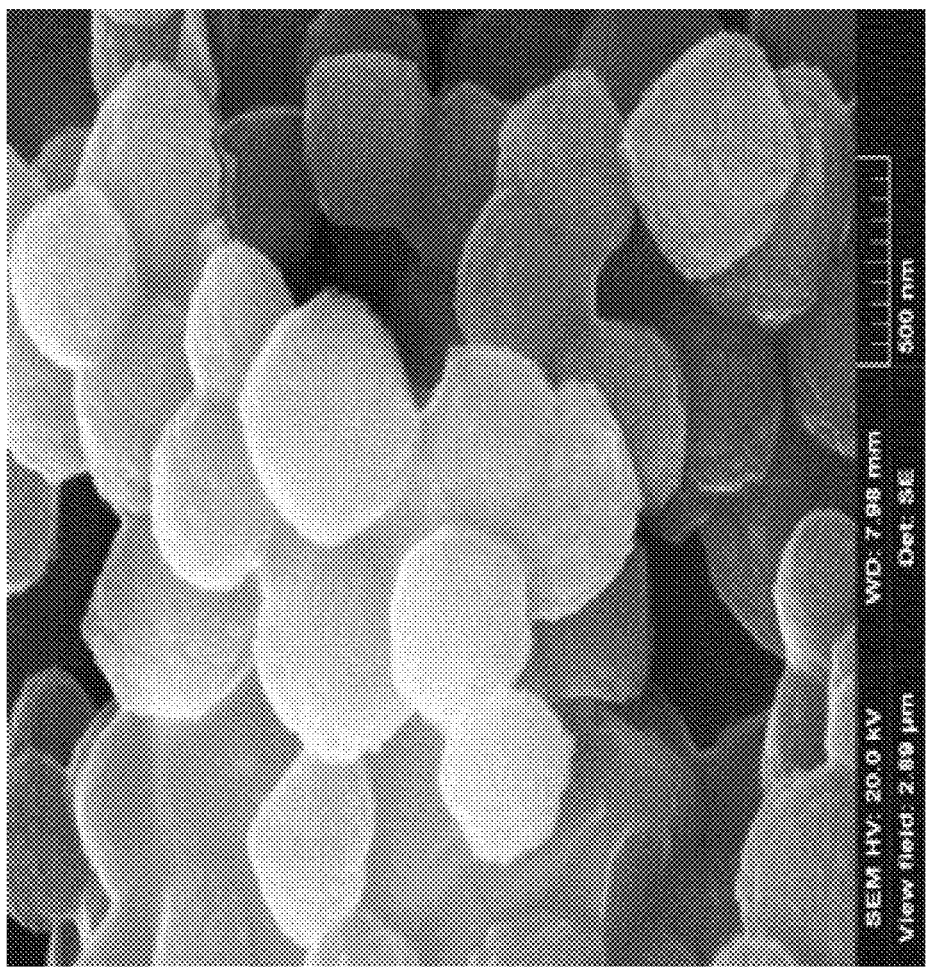
FIG. 2 is a scanning electron microscope (SEM) image of hydrophobic-like, nano-sized BEA zeolite crystals including a metal oxide, initially produced with a silicon to aluminum ratio of 20.

FIG. 2 is a scanning electron microscope (SEM) image of hydrophobic-like, nano-sized BEA zeolite crystals including a metal oxide, initially produced with a silicon to aluminum ratio of 20. Nano-sized BEA zeolites produced from the five consecutive compartments of the process shown in FIGS. 1A and 1B were characterized by SEM. FIG. 2 shows the SEM image of nano-sized BEA zeolite produced after modification with a molar silicon to aluminum ratio of 20. For nano-sized BEA zeolite crystals including a metal oxide produced for example according to systems and processes of FIGS. 1A and 1B, the size range of the crystals produced was between about 300 nm and about 700 nm, in some embodiments.

Figure 3:
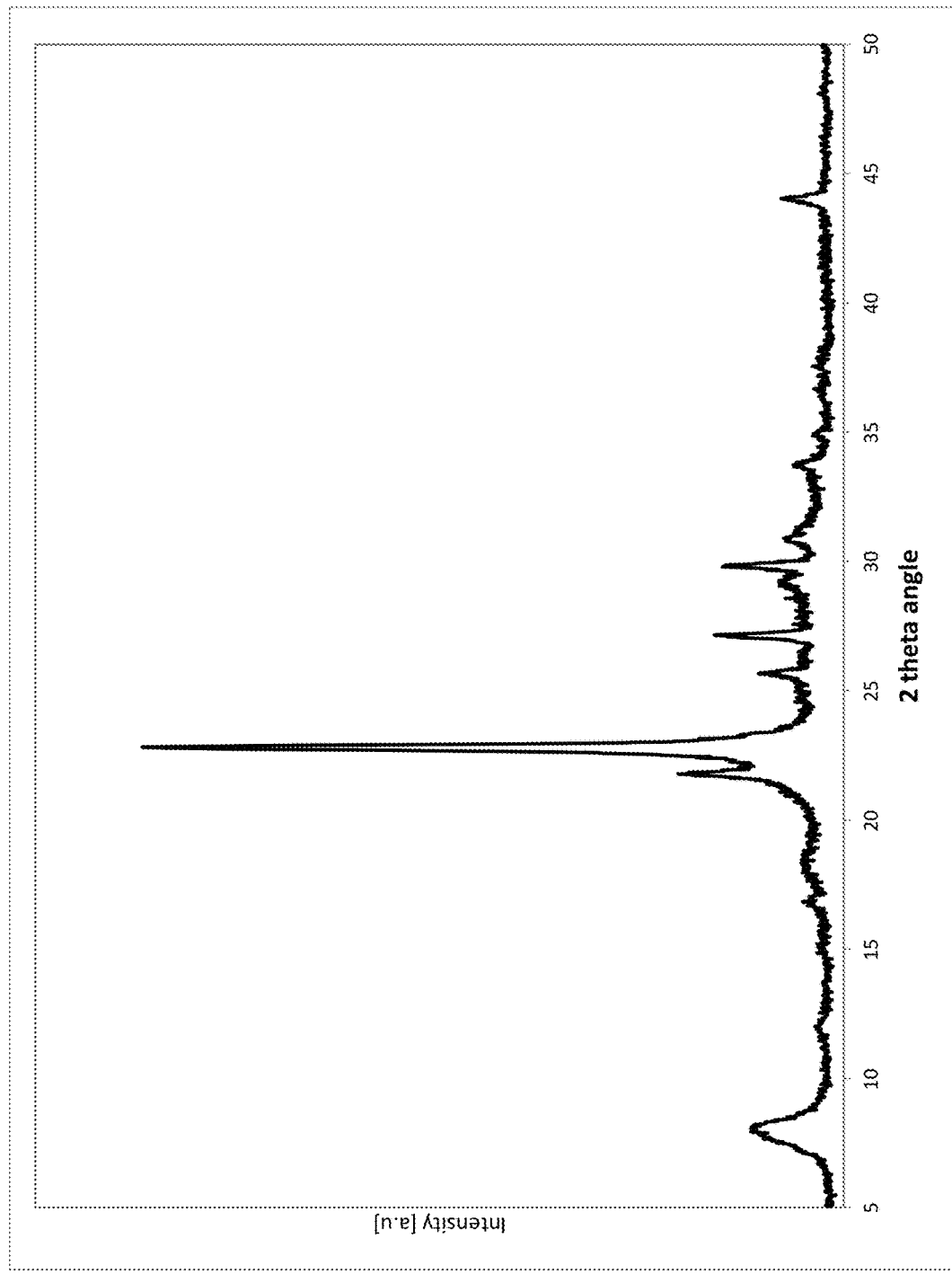
FIG. 3 is a graph showing X-ray diffraction (XRD) analysis results for the hydrophobic-like, nano-sized BEA zeolite crystals including a metal oxide FIG. 2, for example as shown in FIG. 2.

FIG. 3 is a graph showing X-ray diffraction (XRD) analysis results for the hydrophobic-like, nano-sized BEA zeolite crystals including a metal oxide, for example as shown in FIG. 2. The 2-theta peaks for crystals of nano-sized BEA zeolite including a metal oxide are similar to the reference XRD peaks of un-modified BEA zeolite generally.

rate of 10° C./min to detect and measure the quantity of ammonia released from the zeolite providing surface acidity.

Figure 4:
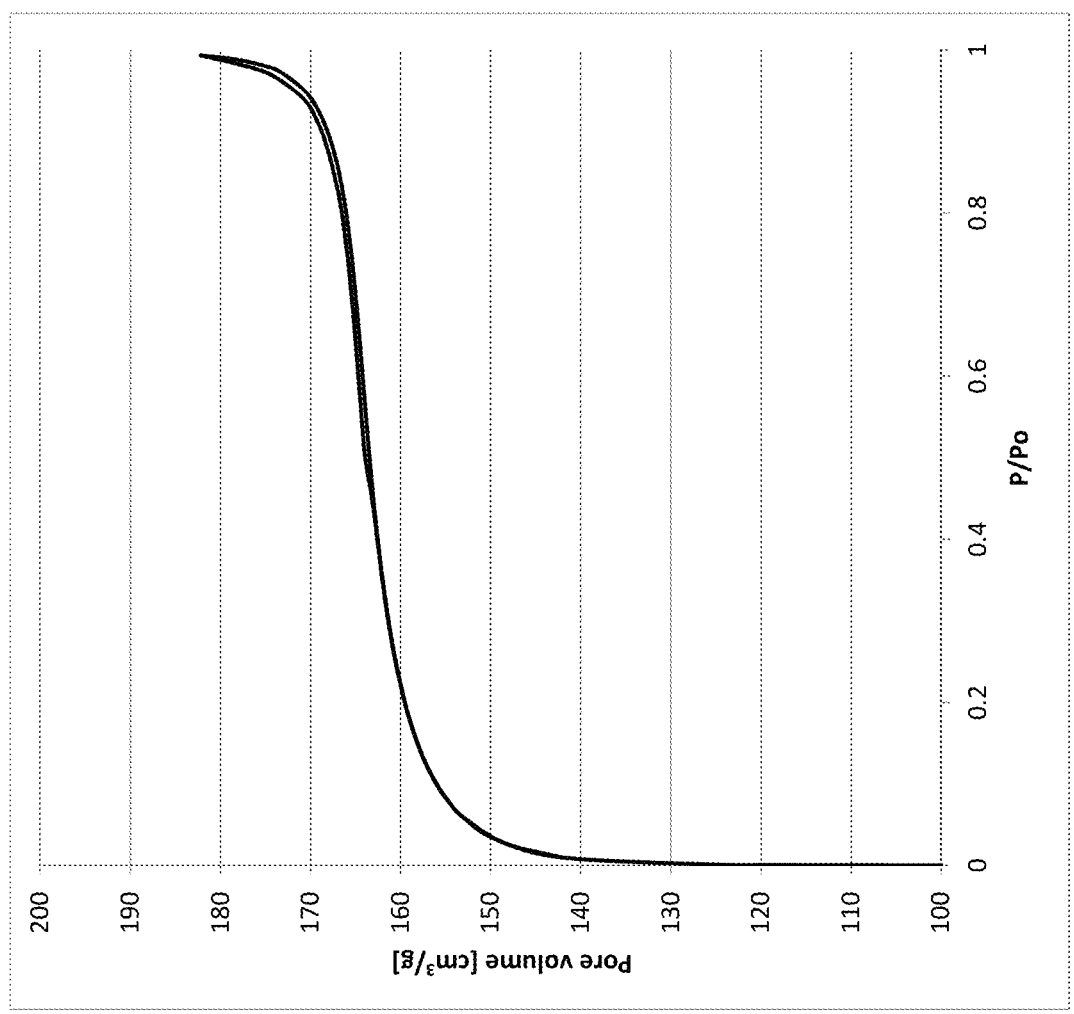
FIG. 4 is an isotherm plot of nano-sized BEA zeolite before modification with a metal oxide.
Figure 5:
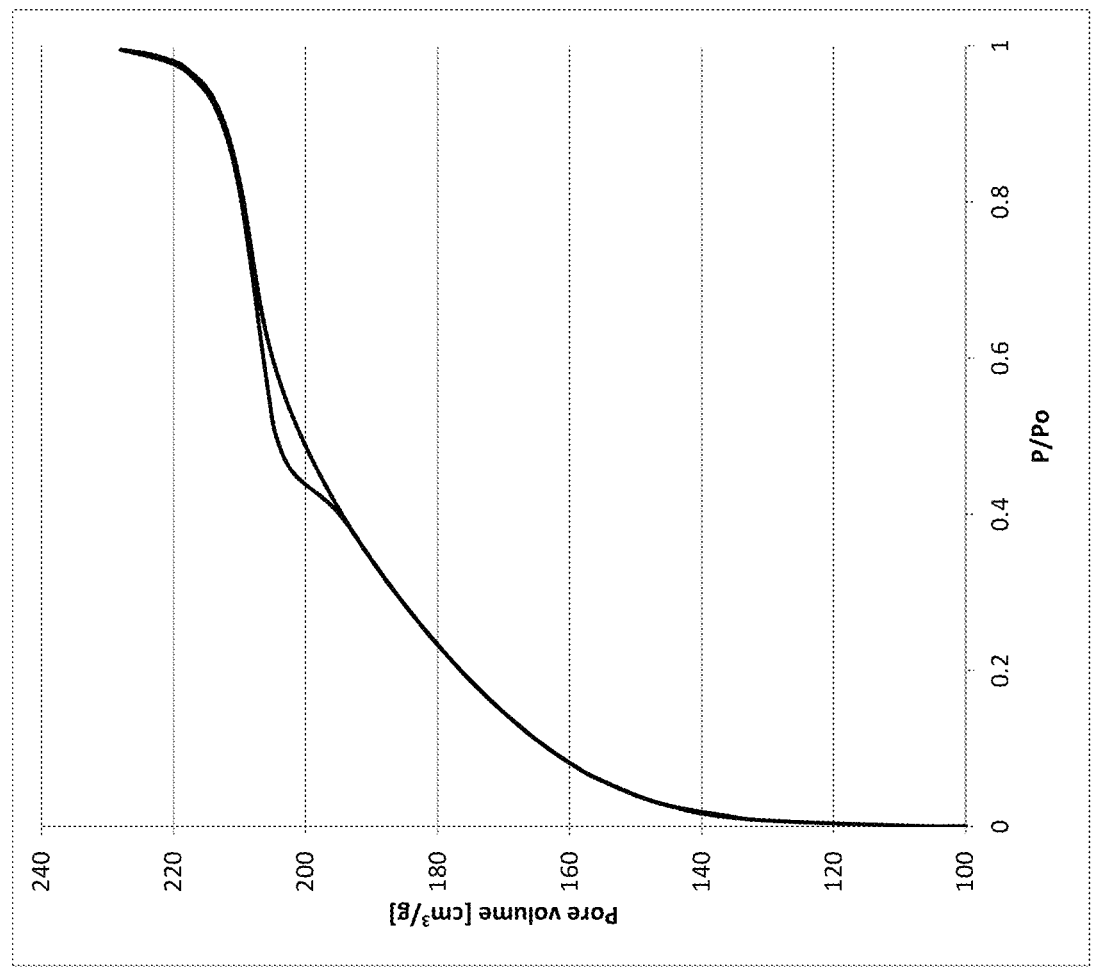
FIG. 5 is an isotherm plot of nano-sized BEA zeolite after modification with a metal oxide.

The texture properties of produced nano-sized BEA zeolite crystals including a metal oxide and precursor BEA zeolite were measured by using nitrogen adsorption-desorption isotherms. FIG. 4 is an isotherm plot of nano-sized BEA zeolite before modification with a metal oxide. FIG. 5 is an isotherm plot of nano-sized BEA zeolite after modification with a metal oxide.

FIG. 4 exhibits an adsorption isotherm of Type I for non-treated BEA zeolite. However, FIG. 5 for produced nano-sized BEA zeolite crystals including a metal oxide exhibits a combination of Type I and Type IV isotherm plots, and a narrow hysteresis loop suggests the association with pore condensation into a mesoporous formation. From the Brunauer-Emmett-Teller (BET) isotherm, the modified nano-sized BEA zeolite crystals including a metal oxide exhibit a greater nitrogen uptake with monolayer coverage of 224 $cm^3$/g of catalyst at standard temperature and pressure (STP), which indicates zeolite adsorption is increased due to the availability of micropores and mesopores. The adsorption isotherm is an IUPAC classification of texture property of catalyst materials. Type I adsorption is limited to the completion of a single monolayer of adsorbate, and it is common for microporous zeolite material. Type IV shows mesoporous catalyst with adsorption hysteresis indicating the mesoporous pores increased after treatment.

Table 1 shows BET surface area of nano-sized BEA zeolite before modification and after modification with a metal oxide. The modification shows an increase of the total surface area by about 22% compared with non-modified nano-sized BEA zeolite. The modified BEA zeolite shows an increase of mesoporosity surface area in the range of 330%.

TABLE 1

The textural properties of nano-sized BEA zeolite crystals before and after incorporation of a metal oxide, with silicon to aluminum molar ratio of 20.

| Zeolite | Surface area micropore ($m^2g^{-1}$) | Surface area mesopore ($m^2g^{-1}$) | Total surface area $m^2g^{-1}$ | Volume of micropores $m^3g^{-1}$ | Volume of mesopores $m^3g^{-1}$ | Total volume $m^3g^{-1}$ |
|---|---|---|---|---|---|---|
| Nanosized BEA zeolite before treatment | 430 | 74 | 504 | 0.214 | 0.054 | 0.268 |
| Nanosized BEA zeolite after treatment and incorporation of metal oxide | 296 | 318 | 614 | 0.141 | 0.254 | 0.395 |
| % Increase after modification | — | +330% | +22% | — | +370% | +47% |

Produced nano-sized BEA zeolite crystals including a metal oxide were measured for surface acidity, and showed catalytic surface acidity of about 1,200 μmol of $NH_3$/g of catalyst, which shows a strong acidic zeolite catalyst. Surface acidity can range from about 0.5 to about 2.0 mmol of $NH_3$/g, or from about 0.7 to about 1.5 mmol of $NH_3$/g.

Surface acidity was measured by using an ammonia temperature programmed desorption (NH3-TPD) method. A test for 100 mg was preconditioned at 650° C. for 60 min with a helium carrier and cooled down to 50° C. before being exposed to 1 mol. % $NH_3$ in He for 30 min. The catalysts were purged again at 100° C. under a flow of He to remove the physiosorbed ammonia for 60 min. The TPD run was then conducted from 100° C. to 700° C. at a heating The surface area and pore volume were calculated by using the Brunauer-Emmett-Teller (BET) method on data obtained by using Micromeritics ASAP® 2420 Accelerated Surface Area and Porosimetry System. The BJH (Barrett, Joyner, and Halenda) adsorption pore size is used to determine the micropores and mesopores of the zeolite. Pores with size between 10 nm and 1 nm are generally referred to as micropores. Pores with size between 10 nm and 50 nm are generally referred to as mesopores. Pores greater than 50 nm are generally referred to as macropores.

The total pore volume of modified nano-sized BEA zeolite had an increase of about 47% compared with the non-modified nano-sized BEA zeolite. Mesoporosity of the framework of BEA zeolite was improved, and the mesoporosity pore volume increased by about 370% compared with the non-modified nano-sized BEA. Mesopore surface area can increase in the range of about 50% to about 600%, or from about 100% to about 400%. Mesopore volume can increase in the range of about 50% to about 600% or from about 100% to about 500%.

Surface area of the micropores decreased from 430 m$^2$g$^{-1}$ to 296 m$^2$g$^{-1}$, and surface area of the mesopores increased from 74 m$^2$g$^{-1}$ to 318 m$^2$g$^{-1}$. The volume of micropores decreased from 0.214 m$^3$g$^{-1}$ to 0.141 m$^3$g$^{-1}$, and the volume of mesopores increased from 0.054 m$^a$g$^{-1}$ to 0.254 m$^3$g$^{-1}$.

Resulting from the innovative systems and processes disclosed here, the modified nano-sized zeolite with metal oxide maintains the BEA zeolite framework, the zeolite has a highly-acidic surface, and there is a large improvement of mesoporosity and pore volume in the zeolite.

Starting with BEA zeolite including an organic template, the BEA zeolite with organic template was processed to remove the template phase and treat the material via five consecutive compartments or units in order to improve the nano-sized BEA zeolite framework for use as a hydrophobic-like catalyst material for hydrocarbon conversions and reactions.

The produced nano-sized BEA zeolite crystals including a metal oxide can be in a size range of from about 100 nm to about 900 nm, or a range of about 300 nm to about 700 nm. The precursor material of unmodified BEA zeolite can be in an organic template phase, for example the sodium aluminate of nano-sized BEA zeolite can be in organic template phase of tetraethylammonium hydroxide (TEAOH). In some embodiments, the sodium aluminate nano-sized BEA zeolite in organic template phase of tetraethylammonium hydroxide is heated at between about 135° C. and about 155° C., preferable about 145° C., with a temperature ramp rate of 5° C./min. In some embodiments, the solution is heated isothermally for between about 67 hours and about 77 hours, preferably about 72 hours before further BEA zeolite modification.

Sodium aluminate nano-sized BEA zeolite in an organic template phase of tetraethylammonium hydroxide is treated in some embodiments via a continuous or batch process comprising five consecutive and fluidly coupled compartments in order to activate the zeolite to be a hydrophobic-like catalyst material. In some embodiments, the compartments include a calcination unit, a desilication unit, a catalytic nitration unit, and protonation unit. The first calcination unit can be used for a second and final calcination step when recycle is used, or some embodiments include a separate second calcination unit.

In some embodiments, in the first compartment for a first calcination step, an oven is operated to increase temperature from an initial temperature of between about 15° C. and about 35° C. to between about 520° C. and about 580° C., preferably about 550° C. The oven is held isothermally for calcination of BEA zeolite for between about 9 and about 13 hours, preferably about 11 hours in order to break organic templated tetraethylammonium from BEA zeolite and convert it into carbon dioxide.

In some embodiments, the desilication unit following the first calcination unit is operated at between about 55° C. and about 75° C., preferably about 65° C., isothermally for a time of between about 10 min. and about 20 min., preferably 15 min. A stirring apparatus of the desilication unit can be operated at a speed of between about 300 rpm and 500 rpm.

In some embodiments, a hydroxide solution with concentration set at between about 0.05 molar and about 0.2 molar, preferably about 0.1 molar is used in a step of desilication. The hydroxide solution includes at least one of sodium hydroxide, beryllium hydroxide, calcium hydroxide, lithium hydroxide, strontium hydroxide, magnesium hydroxide, barium hydroxide, potassium hydroxide, cesium hydroxide, or mixtures thereof.

In some embodiments, the third compartment of five consecutive compartments is the catalytic nitration unit designed to perform incorporation of at least one metal oxide to the desilicated, organic-template-free BEA zeolite. The metal oxide can include any one of or any combination of cobalt oxide, nickel oxide, vanadium oxide, zinc oxide, tungsten oxide, niobium oxide, gallium oxide, copper oxide, iron oxide, palladium oxide, platinum oxide, iridium oxide, ruthenium oxide, and rhodium oxide. The catalytic nitration unit can be operated at a temperature between about 55° C. and about 75° C., preferably 65° C. and at a stirring speed of between about 300 rpm and about 500 rpm for between about 60 min. and about 240 min.

A single metal nitrate solution used to incorporate metal oxide into the BEA zeolite can be in a concentration range of between about 0.4 molar and about 0.8 molar, preferably about 0.6 molar for a single metal nitrate dissolved in distilled water. For an embodiment applying 2 metal nitrates to incorporate 2 metal oxides into BEA zeolite, a total metal nitrate solution can be used at a concentration between about 0.8 molar and about 1.2 molar, preferably about 1.0 molar.

In some embodiments, the fourth compartment of five consecutive compartment is the protonation unit. The protonation unit operates at a temperature between about 75° C. and about 95° C., preferably 85° C., and at a stirring rate of between about 300 rpm and about 500 rpm, preferably about 450 rpm to about 500 rpm. An ammonium nitrate solution for use in the protonation unit is prepared at a concentration of about 2 molar in distilled water, and the mass ratio of solution to zeolite material is about 15-20 to 1. Suitable alternatives to ammonium nitrate include, but are not limited to, any one of or any combination of ammonium hydroxide, ammonium acetate, ammonium oxalate, ammonium nonanoate, ammonium adipate, ammonium carbamate.

In some embodiments, each of the desilication unit, catalytic nitration unit, and protonation unit include at least one inline centrifuge unit operated at speed between about 2000 rpm and about 3000 rpm, preferably between about 2500 rpm and about 3000 rpm, in order to separate light phases of aqueous media from heavy phases of zeolite powder material.

In some embodiments, a second calcination unit for a second calcination step follows the protonation unit. The second calcination unit is operated at two different temperatures. In a first heating mode, the second calcination unit is operated at a temperature between about 90° C. and about 100° C. isothermally for a time of between about 18 to about 24 hours to dry the zeolite from water. In a second heating mode, the second calcination unit is operated at a temperature between about 520° C. to about 580° C., preferably 550° C. under static air, with a temperature ramp rate of 5° C./min and isothermally for a time of between about 9 hours and about 13 hours, preferably about 11 hours.

In some embodiments, produced nano-sized BEA zeolite crystals including a metal oxide have a 300% improvement in mesopore surface area, have a 300% improvement in mesopore volume, and have a 40% improvement in total volume. In some embodiments, the produced nano-sized BEA zeolite crystals including a metal oxide exhibit a combination of Type I and Type IV isotherms of nitrogen adsorption-desorption isotherms.

Hydrocarbon Conversion Example 1

Produced nano-sized BEA zeolite crystals including a metal oxide and being hydrophobic-like, formulated according to the methods and systems described here, were selected for testing as a catalyst in hydrocarbon conversions. Nano-sized BEA zeolite crystals including a metal oxide having a silicon to aluminum ratio of 20 were produced by calcination, desilication, incorporation of cobalt oxide, protonation by ammonia hydroxide, and further calcination.

A steam activity test was conducted for paraffin conversion of dodecane to produce iso-paraffins, cycloparaffins, olefins, and aromatics. A mixed feed comprising 50% by volume hydrocarbons and 50% by volume water (for steam) was pre-heated to about 200° C. and entered into a fixed bed reactor. The liquid hourly space velocity was selected at about 4 $hr^{-1}$ and reaction temperature was set at about 400° C. The steam cracking of the hydrocarbon with nano-sized BEA zeolite crystals including a metal oxide produced the results shown in Table 2.

TABLE 2

Steam catalytic cracking of paraffin (dodecane) results by nano-sized BEA zeolite crystals including a metal oxide via 50 vol. % of steam at 400° C.

| Time of stream | Conversion, Vol % | Iso-paraffins, Cycloparaffins, Olefins and Aromatics Selectivity, Vol % |
|---|---|---|
| 1 hour | 59% | 82% |
| 4 hour | 50% | 78% |
| 8 hour | 48% | 76% |

Hydrocarbon Conversion Example 2

Produced nano-sized BEA zeolite crystals including a metal oxide and being hydrophobic-like, formulated according to the methods and systems described here, were selected for testing as a catalyst in hydrocarbon conversions. Nano-sized BEA zeolite crystals including a metal oxide having a silicon to aluminum ratio of 12.5 were produced by calcination, desilication, incorporation of cobalt oxide, protonation by ammonia hydroxide, and further calcination.

A steam activity test was conducted for paraffin conversion of dodecane to produce iso-paraffins, cycloparaffins, olefins, and aromatics. A mixed feed comprising hydrocarbons at 90% by volume and water at 10% by volume (for steam) was pre-heated to about 200° C. and entered into a fixed bed reactor. The liquid hourly space velocity was selected at about 4 $hr^{-1}$ and reaction temperature was set at about 400° C. The steam cracking of the hydrocarbon with nano-sized BEA zeolite crystals including a metal oxide produced the results shown in Table 3.

TABLE 2

Steam catalytic cracking of paraffin, dodecane, results by nano-sized BEA zeolite crystals including a metal oxide via 10 vol. % of steam at 400° C.

| Time of stream | Conversion, Vol % | Iso-paraffins, Cycloparaffins, Olefins and Aromatics Selectivity, Vol % |
|---|---|---|
| 1 hour | 77% | 88% |
| 4 hour | 70% | 82% |
| 8 hour | 66% | 82% |

Suitable feedstocks for conversion include paraffinic hydrocarbons, but feedstocks need not be limited to pure paraffinics. In some embodiments, the feedstock has at least, 5 wt. % paraffins (as measured by high pressure liquid chromatography (HPLC) methods using ASTM D7419) preferably about 10 wt. % paraffins. Feedstocks can be originated from petroleum-based crude oil, refinery streams, gas-to-liquids (GTL) processes, biomass conversion processes, natural gas conversion processes, or other known processes in the art. In some embodiments, paraffins are in the feedstock ranging from $C_4$ and $C_{4+}$, and ethane and propane are less than about 1 wt. % each in the feedstock.

When using the modified nano-sized BEA zeolite of the present disclosure in these hydrocarbon conversion reactions, temperature and pressure in a reactor should be controlled to make all the reactants (steam and hydrocarbons) present in a vapor phase at the temperature and pressure over the catalyst. Condensed steam can be recycled to the process after certain treatment when required.

The upgraded nano-sized BEA zeolite incorporated with one or more selected metal oxide after desilication improves the zeolite stability framework when used as a catalyst in steam reactions for hydrocarbon conversion.

The upgraded nano-sized BEA zeolite is a hydrophobic-like zeolite and exhibits a suitable framework for hydrocarbon conversion in the presence of steam at a mass ratio of hydrocarbon to steam of about 0.1 to about 2.0.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods for continuously producing consistently-sized and characterizable nano-sized BEA zeolite crystals incorporating at least one metal oxide, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for production of consistently-sized BEA zeolite nano-crystals incorporating at least one metal oxide, the method comprising the steps of:
    removing an organic template from a BEA zeolite comprising an organic template via calcination;
    desilicating the BEA zeolite following the step of removing the organic template;
    incorporating at least one metal oxide into the structure of the BEA zeolite after the step of desilicating, wherein the metal oxide is selected from the group consisting of: cobalt oxide, nickel oxide, vanadium oxide, zinc oxide, tungsten oxide, niobium oxide, gallium oxide, copper oxide, iron oxide, palladium oxide, platinum oxide, iridium oxide, ruthenium oxide, rhodium oxide, and combinations thereof, wherein the step of incorporating at least one metal oxide includes the use of a metal nitrate solution between about 0.4 M and about 1.2 M, wherein the temperature during the step is between about 55° C. and about 75° C., and wherein the step proceeds for between about 60 min. and about 240 min;
    protonating the BEA zeolite after the step of incorporating the at least one metal oxide; and calcining the BEA zeolite after the step of protonating to form a modified BEA zeolite product.

2. The method according to claim 1, where the step of removing the organic template comprises heating the BEA zeolite with the organic template from an initial temperature range of about 15° C. to about 35° C. to reach a temperature range between about 520° C. to about 580° C., at a heating ramp rate of about 5° C./min, for isothermal heating lasting between about 9 hours and about 13 hours.

3. The method according to claim 1, where the organic template comprises tetraethylammonium hydroxide.

4. The method according to claim 1, where the step of desilicating the BEA zeolite includes the use of a hydroxide solution between about 0.05 M and about 0.2 M and where the hydroxide solution includes at least one of sodium hydroxide, beryllium hydroxide, calcium hydroxide, lithium hydroxide, strontium hydroxide, magnesium hydroxide, barium hydroxide, potassium hydroxide, cesium hydroxide, or mixtures thereof.

5. The method according to claim 4, where the step of desilicating includes mixing the BEA zeolite with the hydroxide solution for between about 10 minutes and about 20 minutes at a temperature of between about 55° C. and 75° C., then washing the BEA zeolite with distilled water to obtain a pH range between about pH 7 to about pH 8.5.

6. The method according to claim 1, where the step of protonating includes the use of an ammonium nitrate solution, and where the ammonium nitrate solution is mixed with the BEA zeolite at a temperature between about 75° C. and about 95° C. for about 3 hours.

7. The method according to claim 1, where inline centrifugation is carried out following the steps of desilicating, incorporating at least one metal oxide, and protonating to separate out the BEA zeolite.

8. The method according to claim 1, where the step of calcining after protonating includes a step of drying the BEA zeolite at temperature between about 90° C. and about 100° C. isothermally for an amount of time between about 18 hours and about 24 hours in order to dry the BEA zeolite and remove water.

9. The method according to claim 8, where after the step of drying, the BEA zeolite is heated to between about 520° C. and about 580° C. with temperature ramping at about 5° C./min, with an isothermal heating time of between about 9 and about 13 hours.

10. The method according to claim 1, where the modified BEA zeolite product exhibits characterizable crystals between about 100 nm and about 900 nm.

11. The method according to claim 1, where the modified BEA zeolite product exhibits characterizable crystals between about 300 nm and about 700 nm.

12. The method according to claim 1, where the modified BEA zeolite product exhibits catalytic surface acidity of about 1,200 μmol of $NH_3$/g.

13. The method according to claim 1, where the modified BEA zeolite product exhibits catalytic surface acidity of between about 500 μmol of $NH_3$/g to about 2000 μmol of $NH_3$/g.

14. The method according to claim 1, where the modified BEA zeolite product exhibits catalytic surface acidity of between about 700 μmol of $NH_3$/g to about 1500 μmol of $NH_3$/g.

15. The method according to claim 1, where the modified BEA zeolite product exhibits increased mesopore surface area and increased mesopore volume compared to the BEA zeolite comprising an organic template.

16. The method according to claim 1, where the modified BEA zeolite product exhibits a mesopore surface increase between about 50% to about 600% compared to the BEA zeolite.

17. The method according to claim 1, where the modified BEA zeolite product exhibits a mesopore volume increase between about 50% to about 600% compared to the BEA zeolite.

18. The method according to claim 1, further comprising the step of producing the BEA zeolite comprising an organic template from a solution comprising colloidal silica, tetraethylammonium hydroxide, and sodium aluminate.

* * * * *